(12) United States Patent
Tucker et al.

(10) Patent No.: US 6,778,128 B2
(45) Date of Patent: Aug. 17, 2004

(54) METHOD OF LOCATING UNDERGROUND UTILITY LINES AND AN UNDERGROUND UTILITY LINE

(75) Inventors: Layne Daniel Tucker, Grande Prairie (CA); Peter William Lylick, St. Albert (CA)

(73) Assignee: Guardian Angel Protection Inc., Grande Prairie (CA)

( * ) Notice: Subject to any disclaimer, the term of this patent is extended or adjusted under 35 U.S.C. 154(b) by 0 days.

(21) Appl. No.: 10/359,446

(22) Filed: Feb. 4, 2003

(65) Prior Publication Data

US 2004/0140923 A1 Jul. 22, 2004

(30) Foreign Application Priority Data

Jan. 17, 2003 (CA) .............................................. 2416513

(51) Int. Cl.[7] .......................... G01S 13/88; G01S 13/74
(52) U.S. Cl. ............................ 342/22; 342/27; 342/42; 342/43; 342/175; 342/176; 342/357.01; 342/357.06; 342/357.07
(58) Field of Search ................................ 342/176–186, 342/21, 22, 25, 27, 28, 42, 43–59, 118, 125, 126–156, 175, 195, 357.01–357.17; 324/323, 326, 327–329, 330, 331, 347, 600, 629, 637, 638–646; 405/154.1, 157, 158–173; 367/2–6, 118, 127, 128, 129, 131, 134; 340/572.8; 73/152.58

(56) References Cited

U.S. PATENT DOCUMENTS

| | | | | |
|---|---|---|---|---|
| 3,796,058 A | * | 3/1974 | Jones et al. .................. | 405/157 |
| 3,860,900 A | * | 1/1975 | Scudder .......................... | 367/6 |
| 4,037,189 A | * | 7/1977 | Bell et al. ...................... | 367/127 |
| 4,124,990 A | * | 11/1978 | Bell et al. ..................... | 405/167 |
| 4,388,710 A | * | 6/1983 | Pecon, Jr. ..................... | 367/134 |

(List continued on next page.)

FOREIGN PATENT DOCUMENTS

GB     1302747 A   *  1/1973    ........... G01C/21/04

OTHER PUBLICATIONS

Senator Patty Murray's official Web site, *Murray @ Work*, "Improving the Safety of Pipelines," <http://www.senate.gov/~murray/pipelinemain.html> [retrieved Oct. 17, 2002], 16 pages.

"Office of Pipeline Safety: Hazardous Liquid Pipeline Operators Accident Summary Statistics By Year, Jan. 1, 1986–Dec. 31, 2001," generated Mar. 15, 2002, <http://ops.dot.gov/stats/lq_sum.htm> [retrieved Mar. 29, 2002], one page.

"Office of Pipeline Safety: Natural Gas Pipeline Operators Incident Summary Statistics By Year, Jan. 1, 1986–Dec. 31, 2001, Distribution Operators," generated Mar. 15, 2002, <http://ops.dot.gov/stats/dist_sum.htm> [retrieved Mar. 29, 2002], one page.

"Office of Pipeline Safety: Natural Gas Pipeline Operators Incident Summary Statistics By Year, Jan. 1, 1986–Dec. 31, 2001, Transmission Operators," generated Mar. 15, 2002, <http://ops.dot.gov/stats/tran_sum.htm> [retrieved Mar. 29, 2002], one page.

Photocopy of International Search Report in PCT/CA02/00905, 3 pages, dated Dec. 6, 2002.

*Primary Examiner*—Bernarr E. Gregory
(74) *Attorney, Agent, or Firm*—Christensen O'Connor Johnson Kindness PLLC

(57) ABSTRACT

A method of locating an underground utility line. A first step involves securing transponders along a length of an underground utility line at regular spaced intervals. A second step involves interrogating the transponders to receive transponder signals. A third step involves ascertaining the position of the transponder signals and extrapolating positioning of the underground utility line from the transponder signals.

3 Claims, 2 Drawing Sheets

U.S. PATENT DOCUMENTS

| | | | |
|---|---|---|---|
| 4,486,861 A | * 12/1984 | Harmel | 367/2 |
| 4,600,356 A | 7/1986 | Bridges et al. | |
| 4,746,830 A | 5/1988 | Holland | |
| 4,755,805 A | 7/1988 | Chau | |
| 5,115,223 A | 5/1992 | Moody | |
| 5,198,800 A | 3/1993 | Tozawa et al. | |
| 5,552,772 A | 9/1996 | Janky et al. | |
| 5,576,972 A | 11/1996 | Harrison | |
| 5,659,985 A | * 8/1997 | Stump | 342/22 |
| 5,704,142 A | * 1/1998 | Stump | 342/22 |
| 5,904,210 A | * 5/1999 | Stump et al. | 342/22 |
| 5,914,602 A | 6/1999 | Mercer | |
| 5,933,079 A | 8/1999 | Frink | |
| 5,964,298 A | 10/1999 | Greenspun | |
| 6,003,376 A | 12/1999 | Burns et al. | |
| 6,049,279 A | * 4/2000 | Minarovic | 340/572.8 |
| 6,082,193 A | * 7/2000 | Paulson | 73/152.58 |
| 6,100,806 A | 8/2000 | Gaukel | |
| 6,119,376 A | 9/2000 | Stump | |
| 6,133,738 A | * 10/2000 | Minarovic | 324/326 |
| 6,191,585 B1 | 2/2001 | Mercer et al. | |
| 6,195,922 B1 | * 3/2001 | Stump | 342/22 |
| 6,218,945 B1 | 4/2001 | Taylor, Jr. | |
| 6,246,932 B1 | 6/2001 | Kageyama et al. | |
| 6,252,538 B1 | 6/2001 | Chignell | |
| 6,271,667 B1 | * 8/2001 | Minarovic | 324/326 |
| 6,282,477 B1 | 8/2001 | Gudat et al. | |
| 6,313,755 B1 | 11/2001 | Hetmaniak et al. | |

\* cited by examiner

METHOD OF LOCATING UNDERGROUND UTILITY LINES AND AN UNDERGROUND UTILITY LINE

FIELD OF THE INVENTION

The present invention relates to a method of locating an underground utility line and an underground utility line which has been installed in accordance with the teachings of the method.

BACKGROUND OF THE INVENTION

U.S. Pat. No. 6,282,477 (Gudat et al 2001) describes the simultaneous display of an earthworking machine and an underground object as taken from a utility company map in a data format of the location of their buried utility. The patent reference describes an inherent "region of uncertainty" caused by a number of factors. One of those factors is the fact that subsurface movement can cause utility lines to move underground from their original position.

U.S. Pat. No. 6,119,376 (Stump 2000) describes an excavator navigation system for monitoring an excavator as it progresses along an excavation route and detecting any deviations from the predetermined excavation route. To increase the accuracy of the system, a mobile transponder on the excavator is supplemented by one or more base transponders selectively positioned along the excavation route.

SUMMARY OF THE INVENTION

What is required is a method of locating an underground utility line which will reduce or eliminate the "region of uncertainty".

According to a first aspect of the present invention there is provided a method of locating an underground utility line. A first step involves securing transponders along a length of an underground utility line at regular spaced intervals. A second step involves interrogating the transponders to receive transponder signals. A third step involves ascertaining the position of the transponder signals and extrapolating positioning of the underground utility line from the transponder signals.

With the method, as described above, signals from the transponders can be used to obtain an accurate indication of the positioning of the underground utility.

Although beneficial results may be obtained through the use of the method, as described above, even more beneficial results may be obtained when the transponder signals include vital information regarding the utility line. The transponder signals can communicate whether the utility line is a water line, a natural gas line, an electrical cable or a fiberoptic cable. It can also contain detailed information about the utility line. For example, for a gas line there can be indicated the size of the line, the pressure that the gas is under and an emergency contact number.

There are various ways in which the location of transponders emitting radio frequency signals can be determined. Beneficial results have been obtained when global positioning system (GPS) co-ordinates are determined for each of the transponder signals and the transponder signals from the transponders are displayed on a grid of GPS co-ordinates.

According to a second aspect of the present invention there is provided, in combination, an underground utility line having transponders secured along it's length at regular spaced intervals and a display displaying on a grid of GPS co-ordinates, GPS co-ordinates of transponder signals from each of the transponders, along with positioning of the underground utility line as extrapolated from the transponder signals.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred method of locating an underground utility line will now be described with reference to FIGS. 1 and 2.

Figure 1:
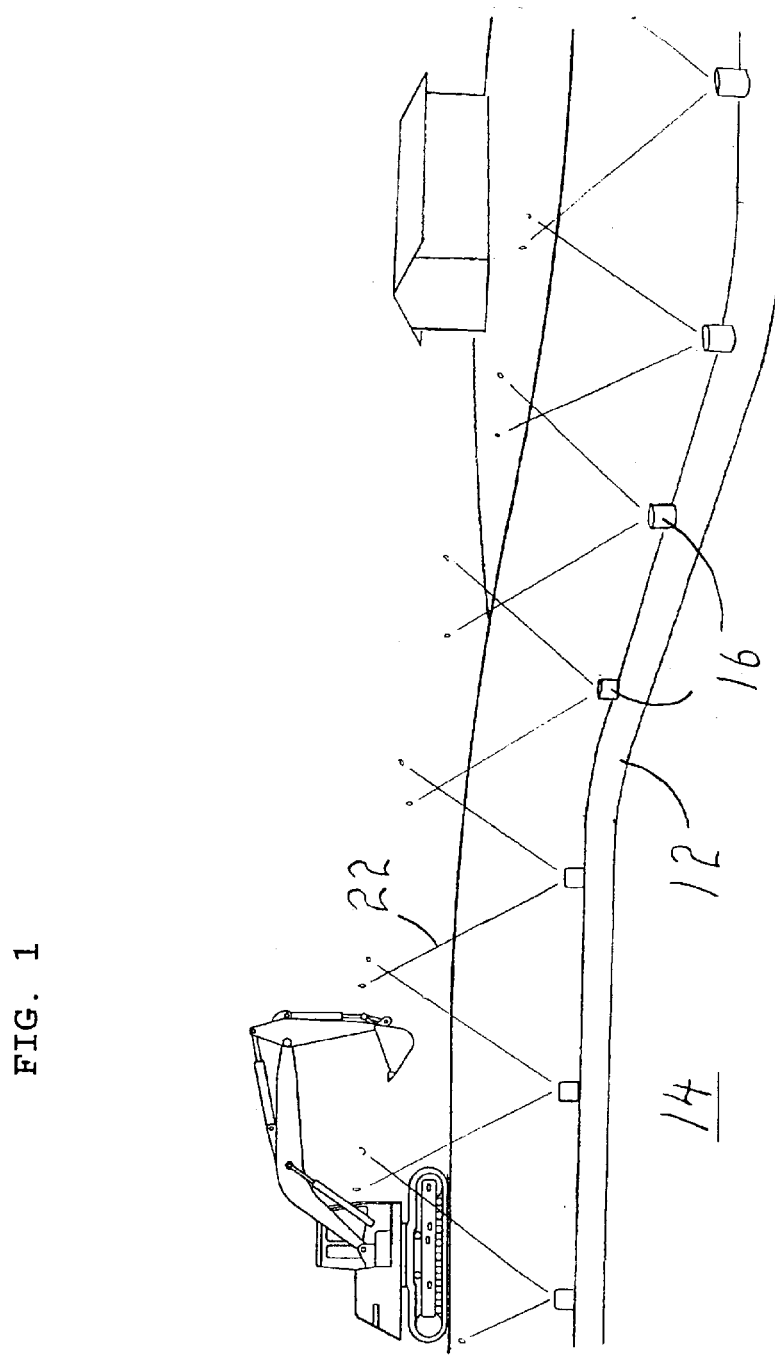
FIG. 1 is a side elevation view, in section, of an underground utility line modified in accordance with the teachings of the present invention.

Structure and Relationship of Parts:

Referring to FIG. 1, a utility line 12 is illustrated buried in ground 14 and having transponders 16 secured along it's length at regular spaced intervals.

Figure 2:
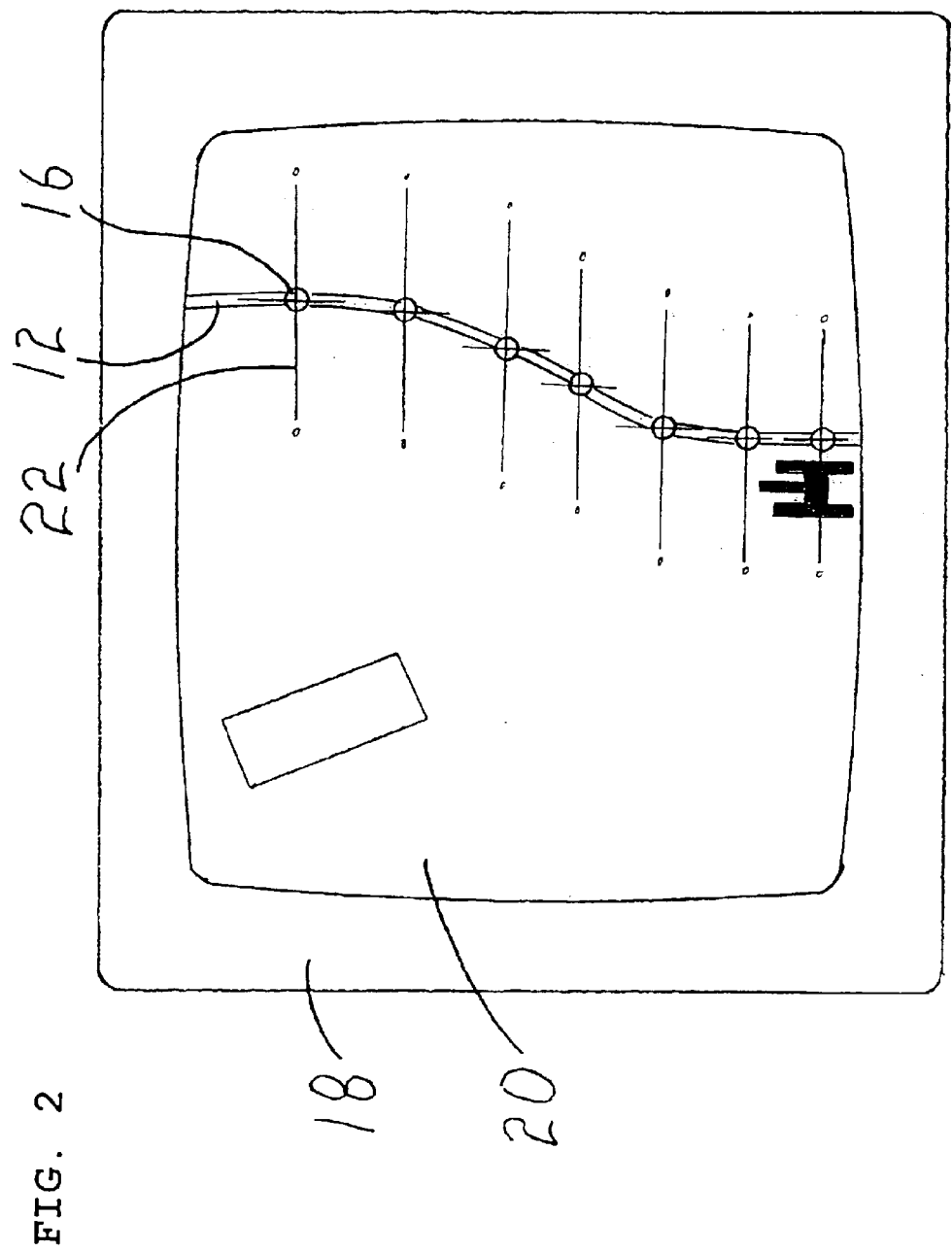
FIG. 2 is a top plan view of a display displaying the underground utility line in accordance with the teachings of the present invention.

Referring to FIG. 2, a display 18 is illustrated. Display 18 displays a grid 20 of global positioning system (GPS) co-ordinates. On grid 20 are positioned global positioning system (GPS) co-ordinates 22 which represent signals from each of transponders 16. Grid 20 also displays the actual positioning of underground utility line 12 as extrapolated by connecting GPS co-ordinates 22.

Operation:

Referring to FIG. 1, at the time of installation of utility line 12 into ground 14, transponders 16 are positioned along utility line 12. Transponders 16 remain dormant until interrogated.

Referring to FIG. 2, when excavation activity is to be conducted in the vicinity of utility line 12, transponders 16 are interrogated and their GPS co-ordinates 22 are determined. GPS co-ordinates 22 are then displayed upon grid 20. From GPS co-ordinates 22 the actual underground positioning of utility line 12 can be displayed on grid 20. The transponder signals provide vital information about utility line 12, so that the nature of the utility line and its characteristics (size, pressure, etc.) are known, along with emergency contact information.

The use of this method and the described combination, allows utility line 12 to be accurately displayed, notwithstanding that some underground movement may have occurred. In this way the "region of uncertainty" is reduced, if not eliminated entirely.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A method of locating an underground utility line, comprising the steps of:

securing transponders along a length of an underground utility line at regular spaced intervals;

interrogating the transponders to receive transponder signals;

ascertaining the position of the transponder signals and extrapolating positioning of the underground utility line from the transponder signals;

determining global positioning system (GPS) co-ordinates for each of the transponder signals; and displaying the transponder signals from the transponders on a grid of GPS co-ordinates.

2. The method as defined in claim 1, wherein the transponder signals include vital information regarding the utility line.

3. In combination:

an underground utility line having transponders secured along its length at regular spaced intervals; and a display displaying on a grid of GPS co-ordinates GPS co-ordinates of transponder signals from each of the transponders, along with positioning of the underground utility line as extrapolated from the transponder signals.

* * * * *